(12) United States Patent
Bouknight, Jr. et al.

(10) Patent No.: US 10,345,991 B2
(45) Date of Patent: Jul. 9, 2019

(54) ADJUSTING APPEARANCE OF ICONS IN AN ELECTRONIC DEVICE

(71) Applicant: International Business Machines Corporation, Armonk, NY (US)

(72) Inventors: Wendell J. Bouknight, Jr., Clayton, NC (US); Erik W. Hochstedt, Holly Springs, NC (US); Thai T. La, Raleigh, NC (US); Dana L. Price, Surf City, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 14/741,368

(22) Filed: Jun. 16, 2015

(65) Prior Publication Data

US 2016/0370972 A1    Dec. 22, 2016

(51) Int. Cl.
*G06F 3/0481* (2013.01)
*G06F 3/0482* (2013.01)
*G06F 3/0484* (2013.01)

(52) U.S. Cl.
CPC ........ *G06F 3/04817* (2013.01); *G06F 3/0482* (2013.01); *G06F 3/04842* (2013.01)

(58) Field of Classification Search
CPC .. G06F 3/04817; G06F 3/0482; G06F 3/0488; G06F 3/04812; G06F 3/04842;

(Continued)

(56) References Cited

U.S. PATENT DOCUMENTS 5,021,976 A * 6/1991 Wexelblat ............. G06T 11/206
                                                          345/581
5,367,626 A * 11/1994 Morioka ............. G06F 3/04817
                                                          715/837

(Continued)

FOREIGN PATENT DOCUMENTS

EP          2023334 A2     11/2009
EP          2172742 A1     7/2010
WO      2011090735 A1     7/2011

OTHER PUBLICATIONS

Jain, Ajay, "An intelligent Algorithm to determine and change icon sizes and layout dynamically on touch devices," IP.com Electronic Publication No. 000218924, Jun. 12, 2012.

(Continued)

*Primary Examiner* — Ryan F Pitaro
*Assistant Examiner* — Carl P Lobo
(74) *Attorney, Agent, or Firm* — Anthony V. S. England; Richard Wilhelm

(57) ABSTRACT

Adjusting appearance of icons in an electronic device includes determining, for icons proximate to one another on a display of the electronic device, a visual property of each icon, wherein the determining includes a computer system computing a quantitative indication of the visual property for each icon. The visual properties of the icons are compared, wherein the comparing includes the computer system determining at least one quantitative difference for the visual properties of the icons. The visual property of at least one of the icons is changed by the computer system responsive to a comparison of the at least one quantitative difference to a predetermined threshold quantity, such that the at least one of the icons is more visually distinct.

9 Claims, 5 Drawing Sheets

(58) Field of Classification Search
CPC ........ G06F 3/0481; G06F 9/542; G06F 3/016; G06F 3/04855; G06F 9/451; G06F 16/26; G06F 16/44; G06F 16/904; G06F 16/24578; G06F 16/248; G06F 16/54; G06F 16/90335; G06F 3/0236; H04N 21/4126; H04L 63/104

See application file for complete search history.

(56) References Cited

U.S. PATENT DOCUMENTS

| | | | | |
|---|---|---|---|---|
| 5,513,306 | A * | 4/1996 | Mills | G11B 27/024 715/202 |
| 5,564,004 | A * | 10/1996 | Grossman | G06F 3/0481 715/811 |
| 5,736,974 | A * | 4/1998 | Selker | G06F 3/04842 345/157 |
| 5,742,287 | A * | 4/1998 | Lection | G06F 3/04842 345/649 |
| 5,742,779 | A * | 4/1998 | Steele | G06F 3/0481 345/660 |
| 5,940,078 | A * | 8/1999 | Nagarajayya | G06F 3/04817 715/835 |
| 6,022,222 | A * | 2/2000 | Guinan | G09B 5/065 345/473 |
| 6,208,344 | B1 * | 3/2001 | Holzman | G06F 3/0481 715/846 |
| 6,362,841 | B1 * | 3/2002 | Nykanen | G06F 3/04817 715/764 |
| 6,600,499 | B1 * | 7/2003 | MacPhail | G06F 3/0481 715/772 |
| 7,013,043 | B2 | 3/2006 | Kashioka | H04N 1/40012 358/518 |
| 7,454,714 | B2 * | 11/2008 | Totman | G06F 3/0482 715/810 |
| 7,573,487 | B1 | 8/2009 | Petersen | G06F 3/04817 345/592 |
| 7,706,033 | B2 | 4/2010 | Kadota | H04N 1/40012 358/3.01 |
| 7,730,422 | B2 | 6/2010 | Russo | G06F 3/04817 715/788 |
| 7,970,240 | B1 * | 6/2011 | Chao | G06F 3/04817 382/305 |
| 8,065,629 | B1 * | 11/2011 | Ragan | G06F 3/0481 715/760 |
| 8,166,412 | B2 * | 4/2012 | Jain | G06F 3/0482 715/700 |
| 8,286,101 | B2 | 10/2012 | Kupka | |
| 8,316,312 | B2 * | 11/2012 | Kim | G06F 3/0481 715/765 |
| 8,392,415 | B2 * | 3/2013 | Wan | G06F 16/58 707/737 |
| 8,542,950 | B2 * | 9/2013 | Berg | G06F 16/583 382/305 |
| 8,594,426 | B2 * | 11/2013 | Bryant | H04N 1/60 382/162 |
| 8,631,345 | B2 * | 1/2014 | Kawaguchi | G06F 3/0481 715/788 |
| 8,743,134 | B2 * | 6/2014 | Brugler | G01C 21/3682 345/581 |
| 8,745,535 | B2 * | 6/2014 | Chaudhri | G06F 3/0481 715/782 |
| 8,781,231 | B1 * | 7/2014 | Kumar | G06K 9/6224 382/190 |
| 8,892,997 | B2 * | 11/2014 | Louch | G06F 3/0481 715/273 |
| 9,025,870 | B2 * | 5/2015 | Ozawa | H04N 1/58 382/167 |
| 9,235,430 | B2 | 1/2016 | Kawaguchi | G06F 9/445 |
| 9,310,964 | B2 | 4/2016 | Li | G06F 8/38 |
| 9,448,691 | B2 | 9/2016 | Suda | G06F 3/0488 |
| 9,612,741 | B2 * | 4/2017 | Brown | G06F 3/04883 |
| 9,633,308 | B2 * | 4/2017 | Tateno | G06N 5/02 |
| 9,785,305 | B2 * | 10/2017 | Alonso Ruiz | G06F 3/04886 |
| 2001/0015719 | A1 * | 8/2001 | Van Ee | G06F 3/04847 345/158 |
| 2001/0035881 | A1 * | 11/2001 | Stoakley | G06F 3/04817 715/772 |
| 2002/0033849 | A1 * | 3/2002 | Loppini | G06F 3/04815 715/848 |
| 2003/0020762 | A1 * | 1/2003 | Budrys | G06F 3/04817 715/835 |
| 2003/0037316 | A1 * | 2/2003 | Kodosky | G06F 3/04817 717/127 |
| 2003/0140346 | A1 * | 7/2003 | Maa | H04N 5/4401 725/87 |
| 2004/0090470 | A1 * | 5/2004 | Kim | G06F 3/0481 715/846 |
| 2004/0155907 | A1 * | 8/2004 | Yamaguchi | G06F 3/0481 715/810 |
| 2005/0043933 | A1 * | 2/2005 | Rappaport | H04L 41/22 703/1 |
| 2005/0060665 | A1 * | 3/2005 | Rekimoto | G06F 9/4443 715/810 |
| 2005/0162402 | A1 * | 7/2005 | Watanachote | G06F 3/03547 345/173 |
| 2005/0219268 | A1 * | 10/2005 | Kyle | G08G 1/096811 345/660 |
| 2005/0229103 | A1 * | 10/2005 | King | G06F 3/0481 715/741 |
| 2005/0240878 | A1 * | 10/2005 | Anthony | G06F 3/04817 715/765 |
| 2005/0251758 | A1 * | 11/2005 | Cummins | G06F 3/04817 715/838 |
| 2005/0270307 | A1 * | 12/2005 | Jacques Brouaux | G06F 3/0481 345/619 |
| 2005/0283742 | A1 * | 12/2005 | Gusmorino | G06F 3/04817 715/839 |
| 2006/0100722 | A1 * | 5/2006 | Bell | G06F 17/5004 700/59 |
| 2006/0122916 | A1 * | 6/2006 | Kassan | G06Q 30/06 705/26.8 |
| 2006/0176503 | A1 * | 8/2006 | Brownstein | G06Q 30/06 358/1.15 |
| 2006/0268007 | A1 * | 11/2006 | Gopalakrishnan | G06F 17/30244 345/619 |
| 2007/0036371 | A1 * | 2/2007 | Buil | G06F 16/5838 381/312 |
| 2007/0070468 | A1 * | 3/2007 | Ogawa | H04N 1/6075 358/518 |
| 2007/0082707 | A1 * | 4/2007 | Flynt | G06F 3/0481 455/564 |
| 2008/0307350 | A1 * | 12/2008 | Sabatelli | G06F 3/0481 715/779 |
| 2009/0094554 | A1 * | 4/2009 | Karstens | G06F 3/04817 715/810 |
| 2009/0235175 | A1 | 9/2009 | Kardamilas | |
| 2009/0254829 | A1 * | 10/2009 | Rohde | G06F 3/0481 715/727 |
| 2009/0271723 | A1 * | 10/2009 | Matsushima | G06F 3/0482 715/769 |
| 2010/0020022 | A1 * | 1/2010 | Russell | G06F 3/0488 345/173 |
| 2010/0036683 | A1 * | 2/2010 | Logan | G06Q 10/10 705/4 |
| 2010/0088639 | A1 * | 4/2010 | Yach | G06F 1/1626 715/825 |
| 2010/0095248 | A1 * | 4/2010 | Karstens | G06F 3/048 715/846 |
| 2011/0106367 | A1 * | 5/2011 | Oda | G07C 5/085 701/31.4 |
| 2011/0138275 | A1 * | 6/2011 | Yu | G06F 3/04817 715/702 |
| 2011/0161076 | A1 * | 6/2011 | Davis | G06F 3/04842 704/231 |
| 2011/0252346 | A1 * | 10/2011 | Chaudhri | G06F 3/04817 715/765 |

(56) References Cited

U.S. PATENT DOCUMENTS

| | | | | |
|---|---|---|---|---|
| 2011/0261049 | A1* | 10/2011 | Cardno | G06Q 10/10 345/419 |
| 2012/0027294 | A1* | 2/2012 | Krolczyk | G06T 11/60 382/165 |
| 2012/0045126 | A1* | 2/2012 | Tomohiro | H04N 1/62 382/167 |
| 2012/0079400 | A1* | 3/2012 | Nauerz | G06T 11/206 715/762 |
| 2012/0151362 | A1* | 6/2012 | Narayanan | H04L 41/0893 715/736 |
| 2012/0176509 | A1* | 7/2012 | Aravamudan | H04N 21/41407 348/231.3 |
| 2012/0188275 | A1* | 7/2012 | Shimazu | G06F 3/0488 345/629 |
| 2012/0201450 | A1* | 8/2012 | Bryant | H04N 1/60 382/162 |
| 2012/0297342 | A1* | 11/2012 | Jang | G06F 3/04817 715/823 |
| 2013/0088517 | A1* | 4/2013 | McKenna | G06F 16/444 345/635 |
| 2013/0132896 | A1* | 5/2013 | Lee | G06F 17/30997 715/808 |
| 2013/0156091 | A1* | 6/2013 | Li | H04N 19/115 375/240.01 |
| 2013/0185642 | A1* | 7/2013 | Gammons | G06F 3/0482 715/733 |
| 2013/0229440 | A1* | 9/2013 | MacDonald | G09G 5/14 345/681 |
| 2013/0305187 | A1* | 11/2013 | Phillips | G06F 3/04817 715/800 |
| 2013/0318013 | A1* | 11/2013 | Tateno | G06N 5/02 706/12 |
| 2014/0002506 | A1* | 1/2014 | Li | G06F 8/38 345/666 |
| 2014/0013254 | A1* | 1/2014 | Hosein | G06F 3/04817 715/765 |
| 2014/0085325 | A1* | 3/2014 | Tsukada | G09G 5/006 345/589 |
| 2014/0143691 | A1* | 5/2014 | Huang | H04N 5/44513 715/762 |
| 2014/0165006 | A1* | 6/2014 | Chaudhri | G06F 3/04817 715/835 |
| 2014/0201655 | A1* | 7/2014 | Mahaffey | G06F 3/04817 715/765 |
| 2014/0267362 | A1* | 9/2014 | Kocienda | G06T 11/001 345/592 |
| 2014/0325447 | A1* | 10/2014 | Jin | G06F 3/04817 715/835 |
| 2014/0362105 | A1* | 12/2014 | Kocienda | G09G 5/02 345/600 |
| 2015/0012853 | A1* | 1/2015 | Chaudhri | G06F 3/04817 715/765 |
| 2015/0049079 | A1* | 2/2015 | Ding | G06T 11/60 345/419 |
| 2015/0121306 | A1* | 4/2015 | Fundament | G06F 3/0482 715/811 |
| 2015/0149964 | A1* | 5/2015 | Bernstein | G06F 3/04815 715/836 |
| 2016/0202866 | A1* | 7/2016 | Zambetti | G06F 3/0485 715/835 |
| 2016/0224787 | A1* | 8/2016 | Guy | G06F 3/04817 |
| 2016/0246475 | A1* | 8/2016 | Garcia | G06F 3/04817 |
| 2016/0283483 | A1* | 9/2016 | Jiang | G06F 16/24578 |

OTHER PUBLICATIONS

IBM, "Technique for Displaying File Icon Status within the Original File Icon Image in High Color Depth Environments," IP.com Electronic Publication No. 000014234, Original Publication Date: Jan. 1, 2000, IP.com Electronic Publication: Jun. 19, 2003.
McGough, Oliver, "Flat Design Is Going Too Far," Feb. 27, 2014, Usabilla Blog, http://blog.usabilla.com/flat-design-going-far.
Kumar, Suraj, "10 Characteristics of a Bad User Experience," Sep. 8, 2014, Usability Geek, https://usabilitygeek.com/10-characteristics-bad-user-experience.
Paunovic, Goran, "The Importance of User Interface Design," Art Version Blog, Jun. 2011, https://artversion.com/blog/importance-of-user-interface-design.
Kholmatova, Alla, "Optimizing UI icons for faster recognition," Sep. 17, 2013, Boxes and Arrows Blog, http://boxesandarrows.com/optimizing-ui-icons-for-faster-recognition.
Harley, Aurora, "Icon Usability," Jul. 27, 2014, Nielsen Norman Group, chttps://www.nngroup.com/articles/icon-usability.
"5 aspects of a good user interface," Feb. 4, 2014, Argon Design, http://www.argondesign.com/news/2014/feb/5/5-aspects-good-user-interface.

* cited by examiner

ADJUSTING APPEARANCE OF ICONS IN AN ELECTRONIC DEVICE

BACKGROUND

Many devices, including mobile phones, tablets, desktop computers, and even smart kitchen appliances may present icons to represent items a user may select, such as applications. The present application concerns adjusting the appearance of such icons.

SUMMARY

A method of adjusting appearance of icons in an electronic device includes determining, for icons proximate to one another on a display of the electronic device, a visual property of each icon, wherein the determining includes a computer system computing a quantitative indication of the visual property for each icon. The visual properties of the icons are compared, wherein the comparing includes the computer system determining at least one quantitative difference for the visual properties of the icons. The visual property of at least one of the icons is changed by the computer system responsive to a comparison of the at least one quantitative difference to a predetermined threshold quantity, such that the at least one of the icons is more visually distinct.

System and computer program products relating to the above-summarized method are also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings.

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Icons in a system (mobile phone, tablet, desktop, even smart kitchen appliances, etc.) may blend-in with one another or other elements of the system, which makes it hard for a user to quickly identify and navigate among icons. Consequently, the user may have to rely on additional cues (e.g., associated icon text) to locate an icon for a particular application, which takes more time for the user and can lead to dissatisfaction with the system or individual applications associated with the icons.

Embodiments of the present invention presented herein provide processes and structures that enable detecting neighboring user interface ("UI") elements, identifying their properties, and responsively altering UI appearances, wherein the altering is according to rules defined by application developers, so that icons are presented in a more distinctive manner. This may lead to more user satisfaction with each icon's associated application and, hence, may even lead to more revenue for the application developers.

This adaptive approach to icon presentation allows application developers to create a livelier sense within devices, while end-users remain free to add/remove applications and their associated icons and to reorganize icons, such as to group similar or most-used functions together. By evaluating and responding to changes in neighboring UI elements, the system conveys a feeling to the end user that the system is paying attention to the user's actions. It also further presents an appearance as if individual applications are alive and competing with each other, which provides an organic feeling for the end user.

To be clear, the present application concerns presenting a clear and visually pleasing view of icons, which may not necessarily involve user actions. For example, the system is disclosed herein may adjust icons for a prebuilt image loaded onto a device, such as a stock home page for a smart phone.

Figure 1:
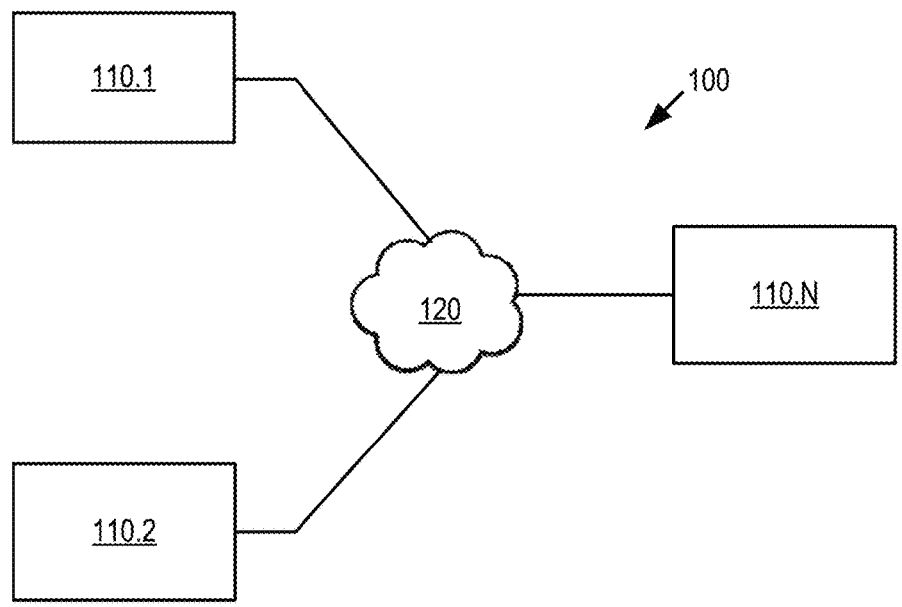
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include modules, which may be program or hardware modules, configured to perform tasks for their own respective systems or for other systems or both.

Figure 2:
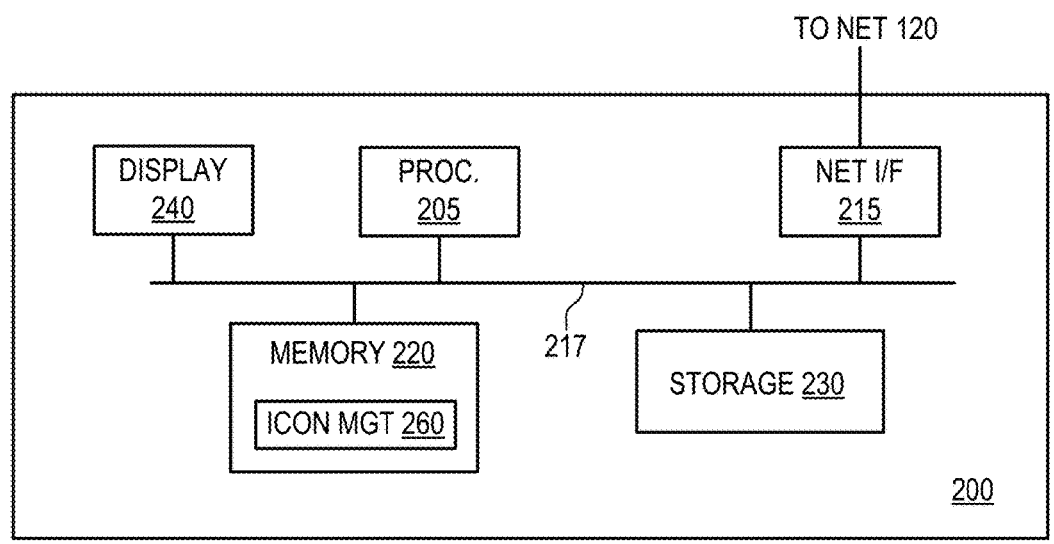
FIG. 2 is a block diagram of devices shown in FIG. 1, according to embodiments of the present invention.

FIG. 2 illustrates details of a computer system 200 suitable as computer systems 110.1, 110.2, etc. according to embodiments of the present invention, wherein system 200 includes at least one central processing unit (CPU) 205, network interface 215, interconnect (i.e., bus) 217, memory 220, storage device 230 and display 240 where system 200 may include an icon management module 260. CPU 205 may retrieve and execute programming instructions stored in memory 220 for applications, including module 260. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random access memory, which includes data and program modules for run-time execution, such as model builder 103, according to embodiments of the present invention. It should be understood that system 200 may be implemented by other hardware and that one or more modules thereof may be firmware.

Figures 3A, 3B:
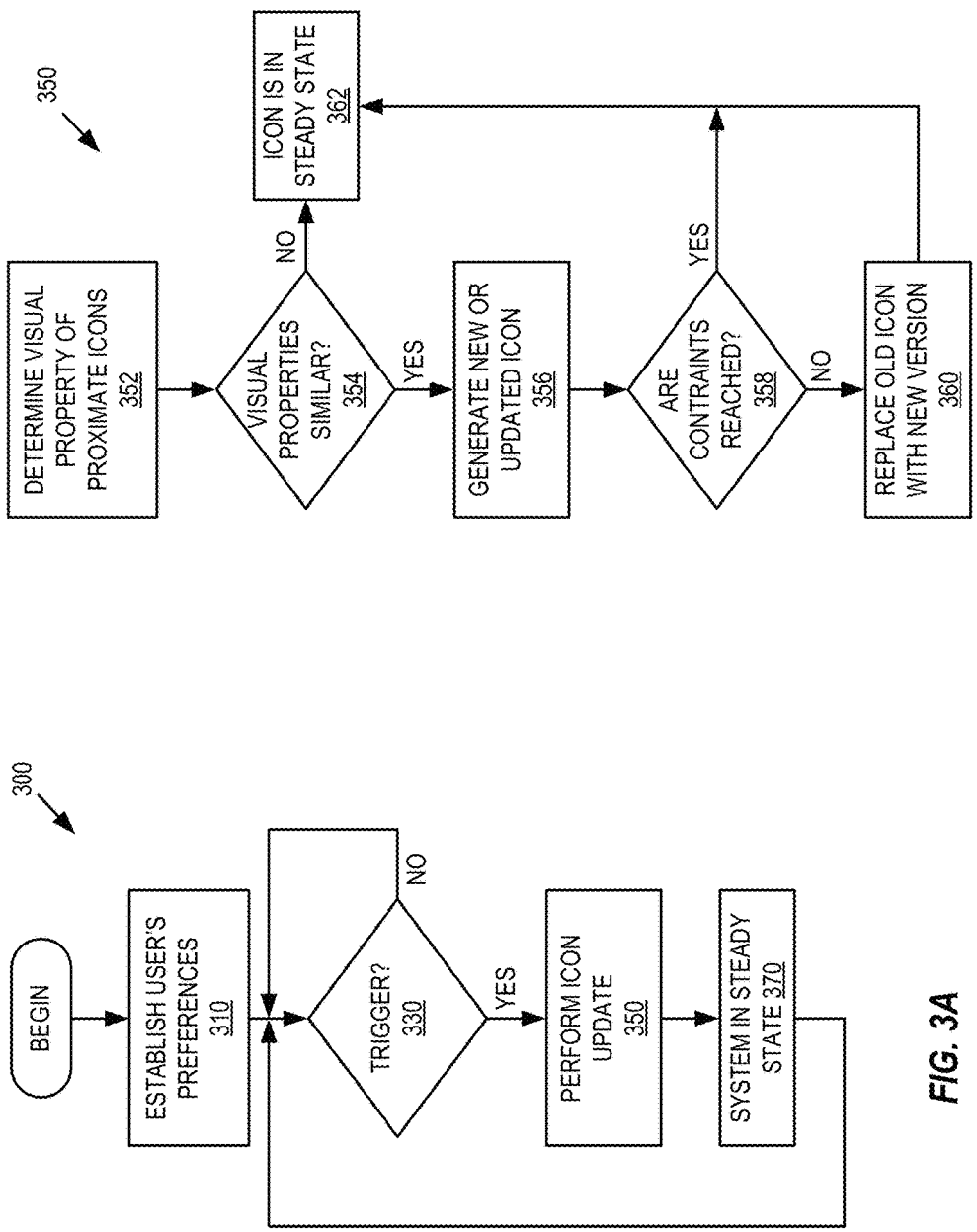
FIGS. 3A and 3B illustrate processes, according to embodiments of the present invention.

Referring to FIG. 3A together with FIG. 2, a computer system 200 presents two or more icons on a display 240, wherein module 260 includes an executing process 300 that determines neighbors for each icon and assigns them average hue values according to a predefined algorithm. Tools are available to derive an average hue value for an image and may be applied by module 264 to the icons as images. One such tool is the Image Color Summarizer, v0.52, (c) 2006-2015, Martin Krzywinski, which is available at mkweb.bcgsc.ca. In one aspect, after receiving 310 an initialization action, including an initial selection indicating how to compare icons and what similarity threshold to apply, process 300 initially determines at 330 that an initial set of icon management actions 350 should be performed to potentially adjust icon appearances. Then, once process 300 obtains a desired amount of change, as determined at 370 based on either the icons being satisfactory or an adjustment limit being reached, for example, process 300 returns to waiting at 330 for a next triggering event for adjusting icons again. For example, responsive to process 330 detecting a change in icons later, process 350 steps through the icons once again and alters them again to the extent necessary to make each one distinct from its neighbors or until an icon adjustment limit is reached. This change may be detected at 330, for example when applications are added or removed (by the user or otherwise), desktop icons are moved (which is typically done by the user), etc.

Referring also now to FIG. 3B, process 350 determines 352, for icons proximate to one another on a display of the electronic device, a visual property of each icon, wherein the determining includes a computer system computing a quantitative indication of the visual property for each icon. Determining 352 the visual property of each icon includes determining quantitative average hues of the respective icons, according to one or more embodiments of the present invention.

Process 350 then compares 354 the visual properties of the icons, wherein the comparing includes the computer system determining at least one quantitative difference for the visual properties. For example, process 300 compares 354 each difference in visual properties to a predetermined similarity threshold, where the threshold may be configured by the user, such as in initialization 310, or may be configured by a provider of the device that includes system 200. Process 350 may step through displayed icons one at a time, according to one or more embodiments of the present invention, and calculate differences between each current icon and its respective neighbors according to their respective average colors, for example, or compare the difference in visual properties between the current icon and a set of more than one of its neighboring icons, for example.

Process 350 changes 360 the visual property of at least one of the icons by the computer system, responsive to a comparison of the at least one quantitative difference to a predetermined threshold quantity, such that the at least one of the icons is more visually distinct. For example, if the difference is less than the threshold, process 350 responsively changes the current icon, such as, for example, by selecting a new icon hue, which may be from among a set of pre-determined hues or may be a hue based on a predefined function that depends on the hue of one or more neighboring icons. Alternatively, process 300 may, instead, select an icon having a different graphic or textual appearance or both. In general, process 300 may select an icon having a different hue and a graphic or textual appearance or any combination thereof.

Figure 4:
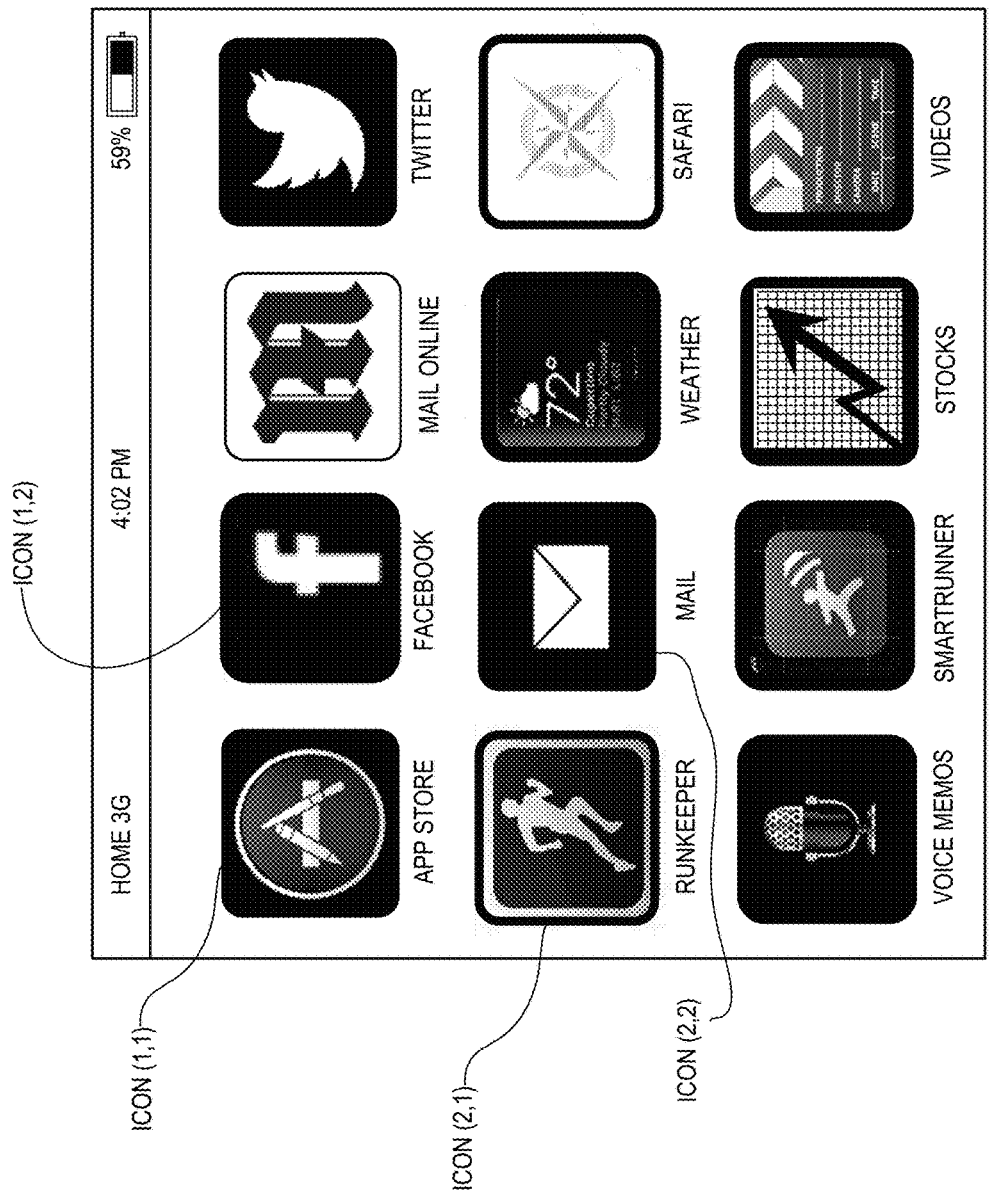
FIG. 4 illustrates icons, according to embodiments of the present invention.

Referring to FIG. 4, additional aspects of embodiments of the present invention are illustrated, wherein icons are arranged in a grid as shown. The icon in the upper left-hand corner of FIG. 4, for example, is referred to herein as row 1, column 1, which may be referred to in (row, column) fashion as (1, 1). Correspondingly, the icon immediately below the one in the upper left-hand corner, for example, is referred to herein as row 2, column 1, that is, (2, 1).

Figure 5:
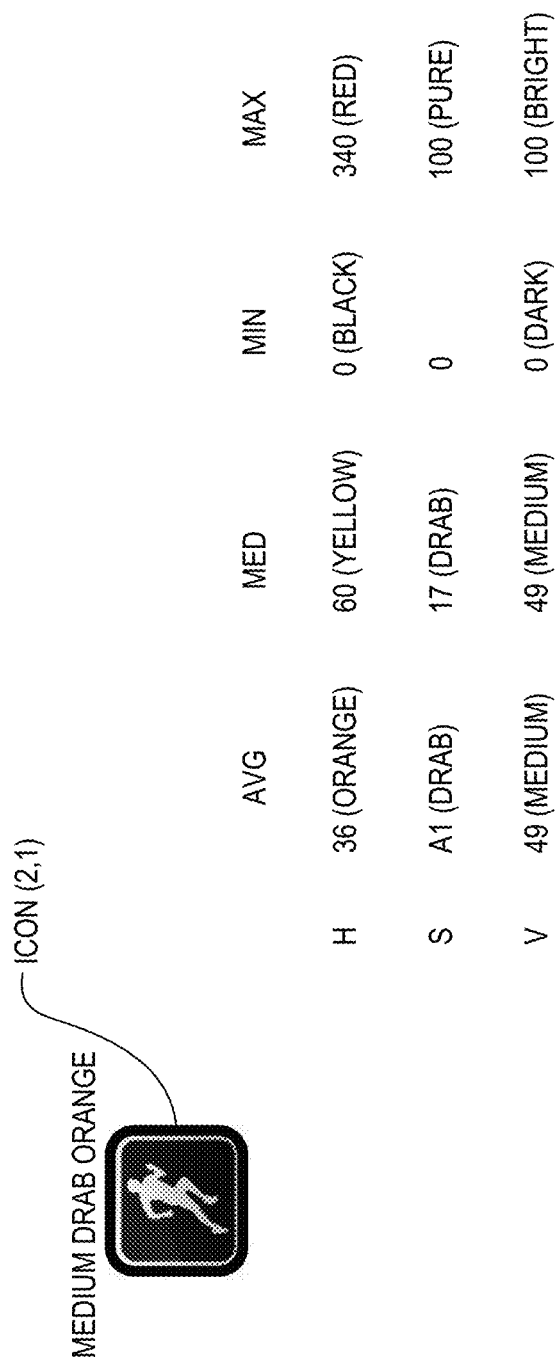
FIG. 5 illustrates quantified visual properties, according to embodiments of the present invention.

Referring to FIG. 5, a hypothetical example is shown of an Image Color Summarizer report for an icon such as icon (2, 1) in FIG. 4. This is not to suggest that all the illustrated aspects of this analysis are required, in order to determine the average hue of icon (2, 1), or even that a report is required, but rather is to illustrate the concept of average hue, as shown.

Process 300 first receives a similarity threshold value selection from the user, such as selection of a similarity threshold=30. Process 300 then begins initial adjustment of icons with icon (1, 1), which includes first determining the average color of the current icon and that of each of its neighbors, that is, icons (1,2), (2,1) and (2,2), according to an embodiment of the present invention. That is, according to the presently described embodiment of the present invention, process 300 compares the average hue of icon (1, 1) to that of all neighboring icons in order to determine whether to change icon (1,1). So according to this protocol, process 300 does not change icon (1,1) until it has compared it to all its neighboring icons.

For the example user initial selection of the similarity threshold given above, suppose a current icon's average color is pure blue, with average hue=240. If process 300 determines one of the neighboring icons is light blue, with average hue=215, and the other neighboring icons are medium drab orange (average hue=36) and green (average hue=85), process 300 first determines if the color for icon (1,1) is distinctive relative to all its neighbors, i.e., icons (1,2), (2,1) and (2,2), in the example. In one embodiment, process 300 compares the current icon to the average of the average hues of the respective neighboring icons. In this example, the average of the neighboring hues=(215+36+85)/3=112. The difference between average hue of the current icon and the average of its neighbors=240−112=128. Since 128 is >30, the selected similarity threshold, process 300 does not change the color of the current icon. This example and other examples presented herein are not intended to limit the disclosure. Other alternative embodiments are possible and encompassed within the scope of this disclosure.

According to another embodiment of the present invention, process 300 compares the current icon to the average hue of each respective neighboring icon and changes the current icon's hue if its average hue is too similar to the average hue of any one of the neighboring icons. So in the above example, process 300 determines the current icon (1,1), with its average hue of 240, is too similar to the neighboring icon that has an average hue of 215, since 240−215<30, which is the user-selected similarity threshold in this example. So in this instance, process 300 determines a new hue for the current icon. To do this, process 300 first determines what range of hues is possible, given the hues of its neighbors.

Figure 6:
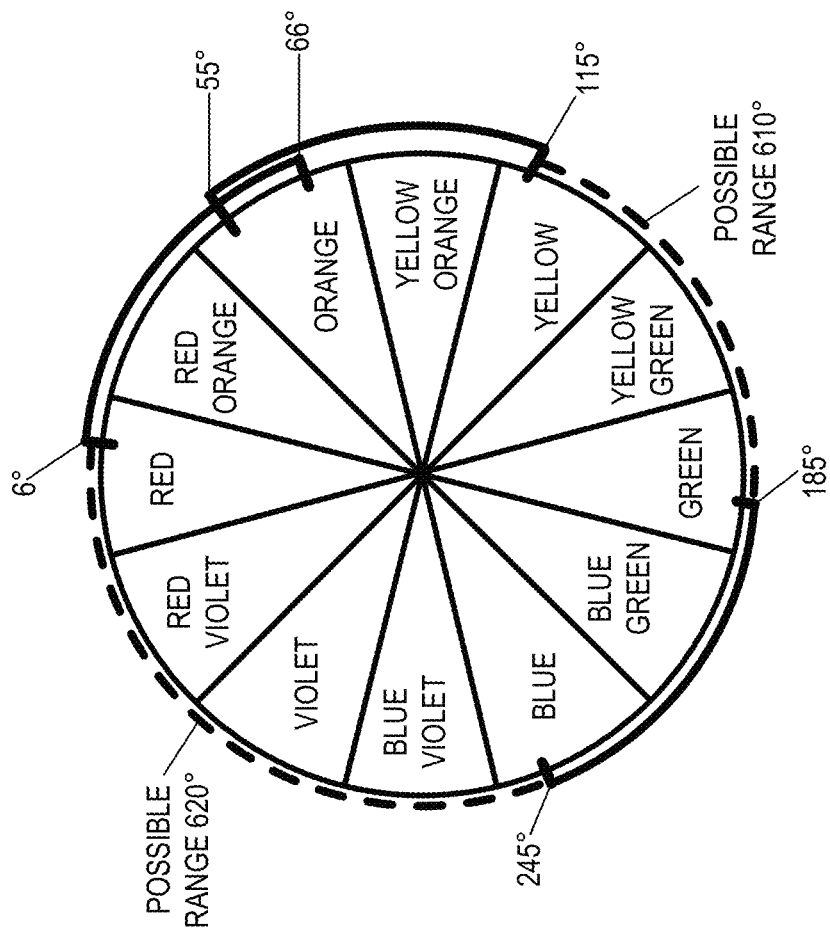
FIG. 6 illustrates ranges of visual properties, according to embodiments of the present invention.

Referring to the color wheel shown in FIG. 6, in this example, process 300 excludes the following ranges of hues:

185-245, due to one neighbor having average hue=215 (i.e., the range 185 to 245=215+/−30, where 30 is the current similarity threshold);

6-66, due to one neighbor having average hue=36; and 55-115, due to one neighbor having average hue=85.

For the current icon this leaves a first possible range 610 of average hue values that extends from greater than 115 to less than 185, which is a range of 70, and a second possible range 620 of average hue values that extends from greater than 245 and less than 366, which is a range of 121. In order to maximize the differences among colors, process 300 selects an average hue for the current icon in the middle of the largest range, i.e., midway between 245 and 360, which is 302.5.

Regarding which icons are neighbors, in one alternative to the above described embodiment, only adjacent icons in the same row are considered as neighbors. In the embodiment that deems neighbors to be limited to only same-row adjacent icons, the only neighbor for icon (1,1) is icon (1,2) for the example given. In another alternative, icons that are directly above and below and directly left and right of a current icon are considered as neighbors, but not icons that are diagonally adjacent. In the embodiment that excludes only diagonally adjacent icons, the neighbors for icon (1,1) are limited to icon (1,2) and icon (2,1) for the given example.

Regarding the sequence of comparing icons, process 350 compares the average color of a current icon to that of all neighboring icons before changing the current icon in the above describe embodiment. According to another embodiment of the present invention, process 350 compares the average color of the current icon, i.e., icon (1, 1) in the example, to that of a first neighboring icon, i.e., icon (1,2) in the example, then a second neighboring icon, i.e., icon (2,1) in the example, and so on. If the current icon is too similar to the first neighboring icon, process 300 changes the current icon (1,1) before comparing it to the second neighboring icon, and so on.

Process 356 may select a new graphic for the current icon instead of, or in addition to, changing icon colors. It may be preferred to select a new graphic rather than changing a color in one or more embodiments of the present invention, particularly since business enterprises may have very specific requirements for icons that represent their applications or services, so that business enterprises may provide predetermined icons for process 356 to select among. Alternatively, selecting a new graphic may occur, for example, if the colors of the icons are such that process 350 is unable to change the color of the current icon in a way that sufficiently distinguishes it from all of its neighbors that are considered according to the embodiment.

As previously stated, the following example and other examples presented herein are not intended to limit the disclosure. Other alternative embodiments are possible and encompassed within the scope of this disclosure. In order to determine similarity, each icon graphic has a numeric graphic property value stored with the icon, according to an embodiment of the present invention, such as a value from 1 to 8, where the graphic property values are more nearly equal for graphics that have a similar appearance and where the difference between graphic property values is greater for graphics that are less similar in appearance. Thus, according to an embodiment of the present invention, if a similarity threshold is set to 3, process 356 selects a current icon such that its graphic property value differs from its neighbors by at least 3, irrespective of color.

In an alternative embodiment, process 352 determines a similarity value by a predetermined combining formula that is a function of both color and graphic values. In one such embodiment, the combining formula multiplies the (average color of the current icon)*(graphic property value/8) and multiplies (average of the average colors of the neighboring icons)*(average of graphic property values of the neighboring icons/8). Then process 354 compares these products. If the products are not different by more than a predetermined threshold, process 350 deems the current icon too similar to its neighbors and selects for the current icon a different graphic, color, or both, until the current icon is sufficiently distinct from its neighbors. Again, the above example is not intended to limit the disclosure.

In such an embodiment wherein process 354 compares the average color of a current icon to that of all neighboring icons before changing the current icon and wherein icons that are adjacent above, below, left, right and diagonally are deemed neighbors, process 352 next determines the average color of the next icon (1,2) as the current icon and determines the average color of each of its neighbors, (1,1), (1,3), (2,1), (2,2) and (2,3), compares icon (1, 2) to that of all neighboring icons and, if necessary changes icon (1,2), so that it is distinctive relative to all its neighbors. Process 352 then proceeds to the next icon (1,3) and so on, until it has initialized or updated all icons.

It should be appreciated that a single pass through all displayed icons may modify one or more of the icons in a way that introduces new similarities among icons. According to embodiments of the present invention, this can be addressed by subsequent passes and with a boundary condition. This is not a required feature, but may be included in one or more embodiments. In general, process 360 changes icons to eliminate similarities, but does so in a way that tends to minimize repeated iterations, i.e., looping. That is, process 358 monitors changes to avoid excessive and ineffective icon changing, which may include declaring 362 a steady state condition, wherein the changes are deemed to be sufficient in spite of not completely satisfying the desired similarity threshold difference among neighboring icons. According to embodiments of the present invention, limitations may include limiting the number of changes to an icon and may include limiting the number of icons changed in a single pass through the icons. Avoiding excessive and ineffective changing may also be accomplished partly by applying variations of techniques from the field of cellular automatons.

As previously stated, once icons have been initialized, then after a subsequent change to an icon, such as after the user rearranges the icons or adds or removes an icon, the icon adjusting process 300 repeats icon visual appearance adjustments. One way that process 300 may change an icon is to reset the icon to a default state, which process 300 may do if it determines that the icon will then no longer be less than the defined similarity threshold.

In various embodiments of the present invention, process 300 regulates its actions responsive to receiving the following user selections: i) enablement/disablement of icon adjustment, both for individual icons and globally, i.e, for all icons; ii) amount of similarity required (i.e. must exceed threshold significantly); iii) number of change cycles allowed in an interval, e.g., 2 times/day; iv) contrast; v) thresholds for determining conflict (must be exact, 90% similar, etc.); vi) customization of changes to be applied, including: desired or favorite color schemes (e.g., Hello Kitty v. Batman color schemes) and skins; vii) icon relationship selections to avoid excessive icon changes, including selections for controlling priority of changes by order of installation or priority of changes by user identification and selection of maximum number of modifications permitted per icon and global limit on number of adjustment cycles allowed, including lock the view after two passes and only allow a cycle changes once per day.

In one embodiment of the present invention, process 300 receives a user selection indicating that a user prefers to have similar icons, instead of having icons that are distinctly different than their neighbors. Whereas it was described herein above that process 300 adjusts icons when their average hues are less than the similarity threshold, in order to make icons more different than one another, instead, for this embodiment, process 300 adjusts icons when their average hues are greater than the similarity threshold, in order to make icons more similar to one another. This is useful if a user wants a particular theme or pattern, such as all icons with pastel colors, black/white, etc.

The above-described examples and depictions in the Figures are not meant to imply architectural limitations. For example, any of devices 110.1, 110.2, etc. may be a notebook computer, hand held computer, smart phone, kiosk, etc. Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for adjusting appearance of icons on a display of an electronic device, where the icons include groups, each group having a first icon and a subgroup associated with the group's first icon, where each subgroup includes any icon that is adjacent to the first icon, the method comprising:
   receiving user input enabling automatic changing of appearance of the icons and indicating a threshold amount of similarity;
   initializing the icons of the electronic device responsive to the user input enabling automatic changing of appearance of the icons, where the initializing includes changing, by the computer system in successive iterations from one of the groups to a next one of the groups, a quantitative average hue of the first icon of each group according to a certain procedure, where the change of each group according to the certain procedure increases the visual property quantitative difference between the quantitative average hue of the first icon of the group and quantitative average hue of at least one of the icons of its subgroup, so that the user is more easily able to visually distinguish each icon from any adjacent icon;
   waiting for a user change in icon layout; and
   adjusting the icons responsive to detecting a user change in layout, including changing, by the computer system in successive iterations, a quantitative average hue of the first icon of each group according to the certain procedure, so that the user is again more easily able to visually distinguish each icon from any adjacent icon, where the certain procedure for each respective group includes:
      determining the average quantitative hue of the first icon of the respective group and the average quantitative hues of the icons in its subgroup; and
      responsive to the average quantitative hue of the first icon of the respective group not exceeding the threshold amount of similarity relative to at least one of the average quantitative hues of the icons in its subgroup, determining possible ranges of quantitative hues that are at least the threshold amount of similarity different than the average quantitative hues of the icons in its subgroup;
   wherein changing the quantitative average hue of the first icon of each respective group includes changing the average quantitative hue of the first icon of the respective group to a midpoint of a largest one of the possible ranges.

2. The method of claim 1, wherein icons that are adjacent include icons in a same row.

3. The method of claim 1, wherein icons that are adjacent include icons in a same column.

4. A system for adjusting appearance of icons on a display of an electronic device, where the icons include groups, each group having a first icon and a subgroup associated with the group's first icon, where each subgroup includes any icon that is adjacent to the first icon, comprising:
   a processor; and
   a computer readable storage medium connected to the processor, wherein the computer readable storage medium has stored thereon a program for controlling the processor, and wherein the processor is operative with the program to execute the program for:
   receiving user input enabling automatic changing of appearance of the icons and indicating a threshold amount of similarity;
   initializing the icons of the electronic device responsive to the user input enabling automatic changing of appearance of the icons, where the initializing includes changing, by the computer system in successive iterations from one of the groups to a next one of the groups, a quantitative average hue of the first icon of each group according to a certain procedure, where the change of each group according to the certain procedure increases the visual property quantitative difference between the quantitative average hue of the first icon of the group and quantitative average hue of at least one of the icons of its subgroup, so that the user is more easily able to visually distinguish each icon from any adjacent icon;
   waiting for a user change in icon layout; and
   adjusting the icons responsive to detecting a user change in layout, including changing, by the computer system in successive iterations, a quantitative average hue of the first icon of each group according to the certain procedure, so that the user is again more easily able to visually distinguish each icon from any adjacent icon, where the certain procedure for each respective group includes:
      determining the average quantitative hue of the first icon of the respective group and the average quantitative hues of the icons in its subgroup; and
      responsive to the average quantitative hue of the first icon of the respective group not exceeding the threshold amount of similarity relative to at least one of the average quantitative hues of the icons in its subgroup, determining possible ranges of quantitative hues that are at least the threshold amount of similarity different than the average quantitative hues of the icons in its subgroup;
   wherein changing the quantitative average hue of the first icon of each respective group includes changing the average quantitative hue of the first icon of the respective group to a midpoint of a largest one of the possible ranges.

5. The system of claim 4, wherein icons that are adjacent include icons in a same row.

6. The system of claim 4, wherein icons that are adjacent include icons in a same column.

7. A computer program product for adjusting appearance of icons on a display of an electronic device, where the icons include groups, each group having a first icon and a subgroup associated with the group's first icon, where each subgroup includes any icon that is adjacent to the first icon, including a computer readable storage medium having instructions stored thereon for execution by a computer system, wherein the instructions, when executed by the computer system, cause the computer system to implement a method comprising:

receiving user input enabling automatic changing of appearance of the icons and indicating a threshold amount of similarity;

initializing the icons of the electronic device responsive to the user input enabling automatic changing of appearance of the icons, where the initializing includes changing, by the computer system in successive iterations from one of the groups to a next one of the groups, a quantitative average hue of the first icon of each group according to a certain procedure, where the change of each group according to the certain procedure increases the visual property quantitative difference between the quantitative average hue of the first icon of the group and quantitative average hue of at least one of the icons of its subgroup, so that the user is more easily able to visually distinguish each icon from any adjacent icon;

waiting for a user change in icon layout; and adjusting the icons responsive to detecting a user change in layout, including changing, by the computer system in successive iterations, a quantitative average hue of the first icon of each group according to the certain procedure, so that the user is again more easily able to visually distinguish each icon from any adjacent icon, where the certain procedure for each respective group includes:

determining the average quantitative hue of the first icon of the respective group and the average quantitative hues of the icons in its subgroup; and responsive to the average quantitative hue of the first icon of the respective group not exceeding the threshold amount of similarity relative to at least one of the average quantitative hues of the icons in its subgroup, determining possible ranges of quantitative hues that are at least the threshold amount of similarity different than the average quantitative hues of the icons in its subgroup;

wherein changing the quantitative average hue of the first icon of each respective group includes changing the average quantitative hue of the first icon of the respective group to a midpoint of a largest one of the possible ranges.

8. The computer program product of claim 7, wherein icons that are adjacent include icons in a same row.

9. The computer program product of claim 7, wherein icons that are adjacent include icons in a same column.

* * * * *